United States Patent [19]

Aubert et al.

[11] 4,136,294

[45] Jan. 23, 1979

[54] DIRECT-CURRENT MICROMOTOR

[75] Inventors: François Aubert, Boudry; Marc Heyraud, Les Geneveys, Coffrane, both of Switzerland

[73] Assignee: Portescap, La Chaux-de-Fonds, Switzerland

[21] Appl. No.: 773,328

[22] Filed: Mar. 1, 1977

[30] Foreign Application Priority Data

Mar. 4, 1976 [DE] Fed. Rep. of Germany ....... 2608889

[51] Int. Cl.² .............................................. H02K 13/14
[52] U.S. Cl. .................................. 310/220; 310/266; 310/154
[58] Field of Search .................. 310/154, 220, 266, 27, 310/44, 45, 221–226

[56] References Cited

U.S. PATENT DOCUMENTS

| | | | |
|---|---|---|---|
| 2,667,591 | 1/1954 | Gindroz | 310/45 X |
| 3,163,788 | 12/1964 | Powers | 310/45 |
| 3,591,815 | 7/1971 | Grootenhuis et al. | 310/27 |

FOREIGN PATENT DOCUMENTS 789725  1/1958  United Kingdom ...................... 310/27

Primary Examiner—Donovan F. Duggan
Attorney, Agent, or Firm—Cushman, Darby & Cushman

[57] ABSTRACT

A direct-current micromotor is disclosed which comprises a rotor bearing a motor winding, the rotor being arranged for rotation between a core part and a mantle part of a stator structure. The core part comprises a permanent magnet and the mantle part is made of magnetically conductive material. The motor winding is fed through a commutator comprising a collector and associated brushes. At least a part of the surfaces of the stator facing the rotor winding are provided with an electrically conductive coating to reduce the height of the voltage peaks occuring during the commutation.

6 Claims, 1 Drawing Figure

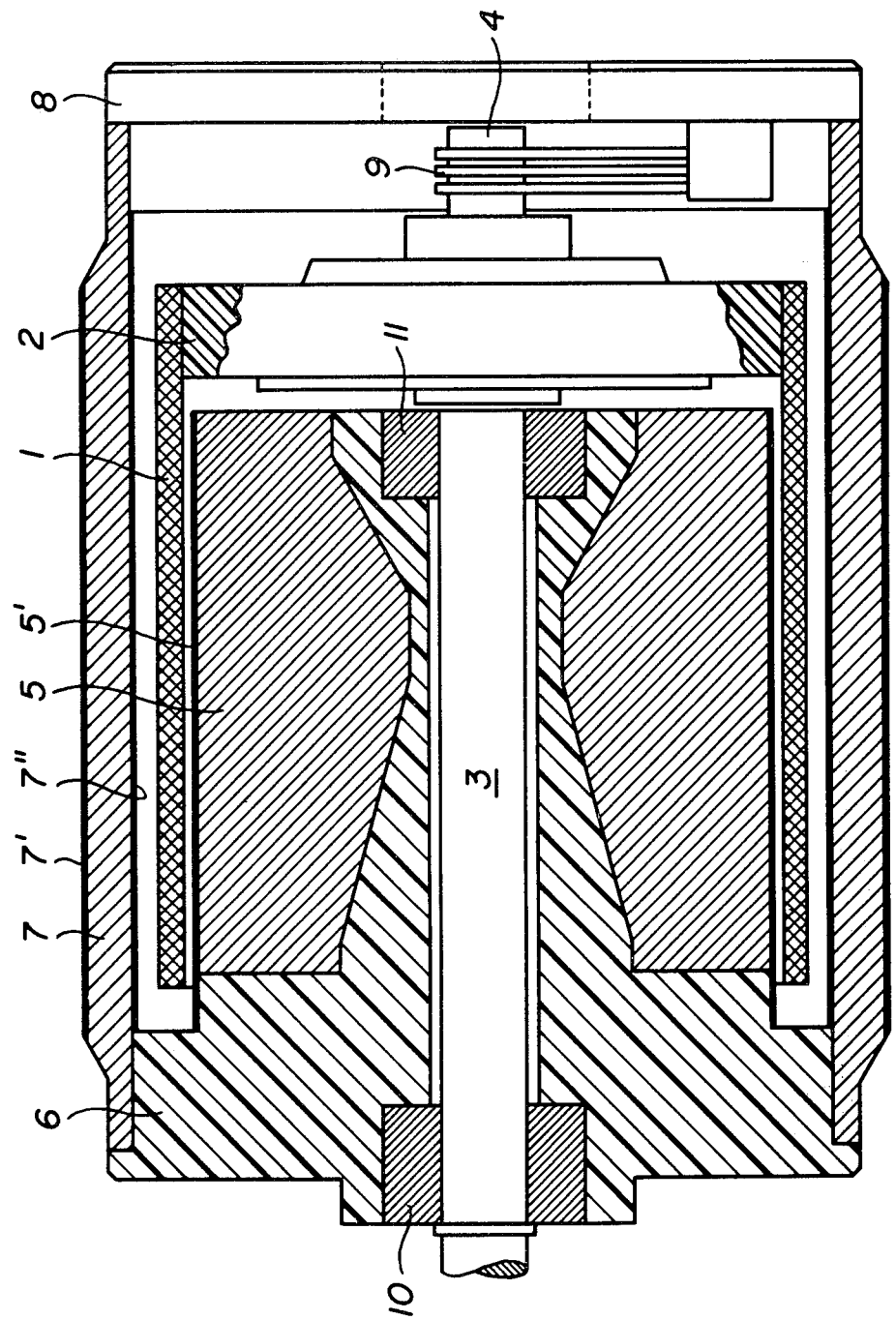

DIRECT-CURRENT MICROMOTOR

The present invention relates to direct-current micromotors of the type in which a rotor bearing a motor winding is arranged for rotation between a core part and a mantle part of a stator structure, one of the said parts comprising a permanent magnet and the other part of the stator structure being at least in part made of magnetically conductive material.

In d.c. micromotors of this type, the motor winding is fed through a commutator in which brushes co-operate with the different segments of a collector. When such a brush passes from one collector segment to another, voltage peaks occur due to the self-inductance of the winding, which voltage peaks lead to the generation of sparks between the brushes and the collector. This effect is very undesirable as it reduces the duration of service of the collector which, in the case of micromotors, is also the duration of service of the motor as a whole.

It is a main object of the invention to considerably reduce the generation of sparks in a micromotor and thus to accordingly increase the duration of service of the same by simple means and without substantially raising the cost of manufacture of the motor.

This is achieved according to the invention by providing at least a portion of the surfaces of the core and/or the mantle part of the stator facing the rotor winding with an electrically conductive coating having a thickness of more than 10 $\mu$ m and having an electrical resistance of less than 0.09 ohm.mm$^2$.m$^{-1}$.

Such a conductive layer constitutes a high load for the circuit of the spark current due to the generation of eddy currents in the said layer when steep voltage peaks occur during the commutation. Those voltage peaks are thus considerably reduced in their height. Furthermore the electrical time constant of the winding is reduced by the measure according to the invention and therefore the current raise in the winding is becoming steeper, which is an additional advantage of the present micromotor.

The conductive layer can be made from copper or silver and its thickness is preferably of more than 80 $\mu$ m.

Further objects and advantages of the invention will become apparent by the description of an embodiment thereof which is given by way of example and illustrated in the enclosed drawing.

The single FIGURE of the drawing represents a longitudinal section through a micromotor according to the invention.

As shown, the micromotor comprises a rotor having a cylindrical motor winding 1 which is fixed at one end thereof on a supporting flange 2. The flange 2 is mounted on a shaft 3 and is integral with a coaxially arranged collector 4. The stator of the shown motor comprises a core part which is formed by a radially magnetised permanent magnet 5 having cylindrical pole surfaces and by a supporting part 6 which projects inside the permanent magnet. Supporting part 6 has a cylindrical flange-like portion and bears on the rim thereof one end of a hollow cylindrical mantle part 7 of soft magnetic material. The mantle part 7 is closed on its other end by a cap part 8. The brushes of the commutator are fixed on the inner side of the cap part 8, only one group of brushes 9 being shown in the drawing. Two bearings 10, 11 are embedded in the supporting part 6 and support the motor shaft 3 extending through a central bore in part 6.

In the present micromotor the cylindrical outer surface of the permanent magnet 5, as well as the inner and outer surfaces of the mantle part 7 facing the winding 1, are each provided with respective layers of copper 5', 7', 7''. The thickness of these layers is for example 0.11 mm and the layers are preferably realized by galvanization.

It appeared that in the said layers a major part of the electrical energy of the spark current circuit is absorbed due to the generation of eddy currents. A reduction of the voltage peaks during the commutation of more than 30 % compared with the voltage peaks in usual motors of the same type has been measured. As the energy of the sparks and the wear of the commutator depends on the square of the voltage, the said percentage leads to a doubling of the duration of service of the motor.

It has further been found, that the electrical time constant of the rotor winding is considerably reduced by the said coatings. Oscillograms of the current in the winding show that the raise of the current is much steeper in motors having coatings according to the invention compared to the usual motors. It is to be noted, that the copper layer on the core part has the major influence on the obtained effect. The power and the efficiency of the motor are practically not modified by the described measure.

Besides copper other materials can also be used for the coating such as for instance silver, but in any case the specific resistance must be smaller than 0.09 ohm.mm$^2$.m$^{-1}$. Also the thickness of the layer should not be less than 10 $\mu$ m. To simplify the construction only partial coating can be used, for instance only portions of the said surfaces or only one or two of the surfaces can be coated.

The present d.c. micromotor allows to obtain a considerably longer duration of service and better electrical properties of the motor by simple means and a low cost, which is of a great importance in view of the total manufacturing cost and the fields of application of those micromotors.

What is claimed is:

1. Direct-current micromotor comprising a rotor bearing a motor winding, a segmented commutator and brush arrangement for supplying currents to said winding, said rotor being arranged for rotation between a core part and a mantle part of a stator structure, one of the said parts of the stator comprising a permanent magnet and the other part being at least in part made of magnetically conductive material, wherein at least a part of the surfaces of at least one of the core part and the mantle part of the stator structure facing the rotor winding is provided with an electrically conductive layer the thickness of which is more than 10 $\mu$ m and the specific electrical resistance is less than 0.09 ohm.mm$^2$.m$^{-1}$.

2. Direct-current micromotor is accordance with claim 1, wherein the rotor bears a cylindrical winding, the core part of the stator comprises a permanent magnet with, at least in part, a cylindrical outer surface and the mantle part comprises a hollow cylindrical part surrounding the winding, the cylindrical outer surface of the permanent magnet being at least in part provided with the said layer.

3. Direct-current micromotor in accordance with claim 2, wherein at least one of the inner and outer surfaces of the cylindrical mantle part is provided with the said layer.

4. Direct-current micromotor in accordance with claim 1, wherein the layer is made of copper.

5. Direct-current micromotor in accordance with claim 1, wherein the thickness of the layer is more than 80 $\mu$ m.

6. Direct-current micromotor in accordance with claim 1, wherein the layer is made of silver.

* * * * *